Nov. 13, 1928.
A. GALLEY
1,691,845
DIRECTION INDICATOR FOR VEHICLES
Filed June 16, 1928
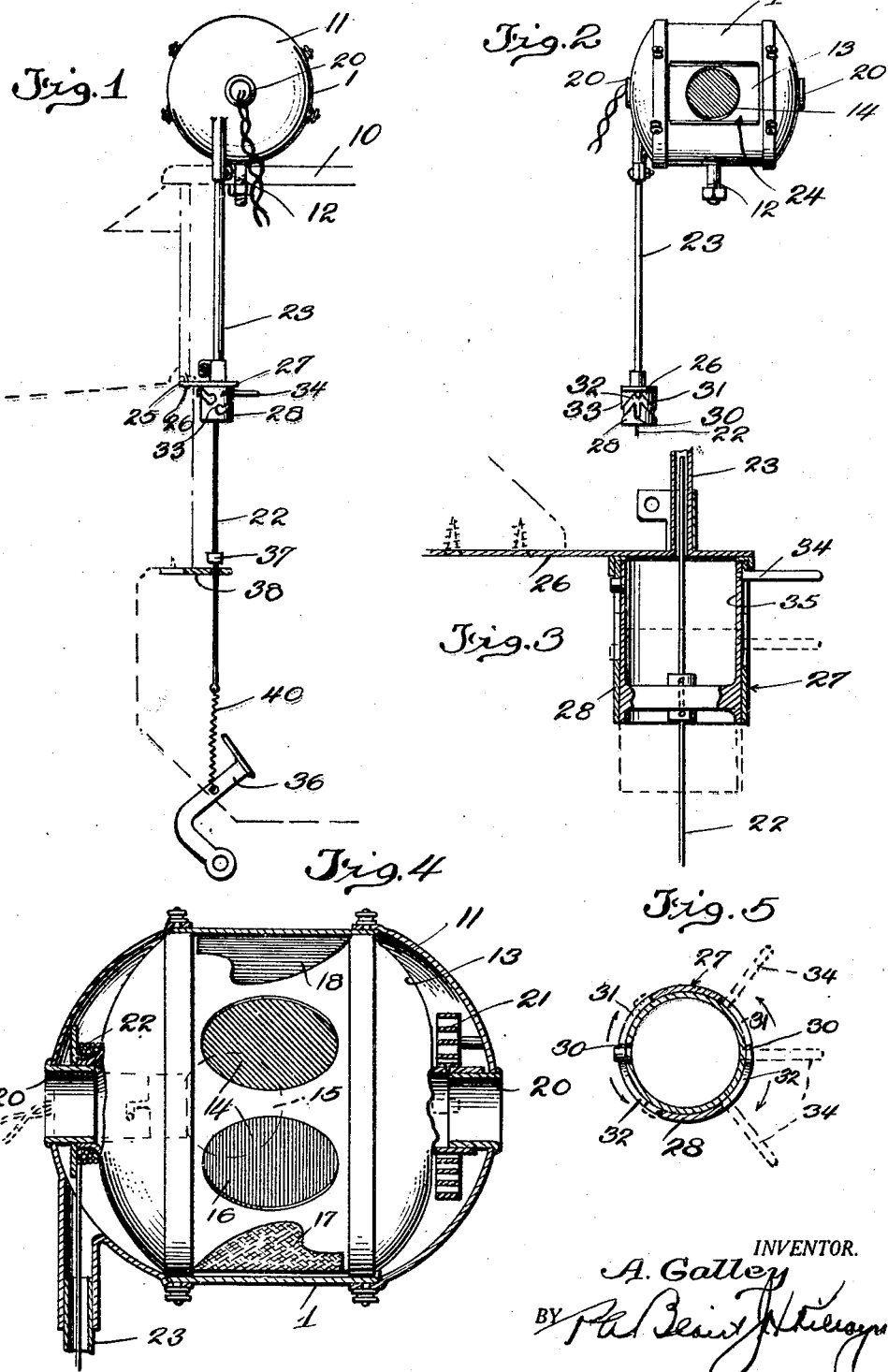

Patented Nov. 13, 1928.

1,691,845

UNITED STATES PATENT OFFICE.

ANDREW GALLEY, OF BUFFALO, NEW YORK.

DIRECTION INDICATOR FOR VEHICLES.

Application filed June 16, 1928. Serial No. 286,015.

This invention relates to direction signals for vehicles and more particularly to that type adapted to be mounted upon a vehicle and visible from both the front and rear to indicate the direction of movement or stoppage of the vehicle.

One of the objects of the present invention is to provide a simple and practical device of the above general character which may be inexpensively manufactured, assembled and installed.

A further object is to provide a mechanism of the above character which may be manually actuated or in part automatically actuated when the vehicle is being stopped or slowed down.

A further object is to provide a highly efficient and reliable mechanism of the above character which may be actuated manually without any special thought or effort on the part of the operator in so far as it will not require or necessitate the driver's eyes leaving the road in order to properly set the indicator for right or left turns.

A further object is to provide a mechanism of the above character, in which the turning indicator will be automatically locked in position until manually released.

A further object is to provide a mechanism of the above general character in which the automatic feature will indicate the stoppage or slowing down of the vehicle, yet automatically return to normal position after the stopping or slowing down is completed.

Other objects will be in part obvious from the annexed drawing and in part hereinafter indicated in connection therewith by the following analysis of the invention.

This invention accordingly consists in the features of construction, combination of parts and in the unique relation of the members and in the relative proportioning and disposition thereof, all as more completely outlined herein.

To enable others skilled in the art to fully comprehend the underlying features of this invention that they may embody the same by the numerous modifications in structure and relation contemplated by the invention, drawings depicting a preferred form of the invention have been annexed as part of this disclosure, and in such drawings like characters of reference denote corresponding parts throughout all of the views, in which—

Fig. 1 is a general view of the apparatus showing its mounting upon a vehicle and its connection with the clutch pedal;

Fig. 2 is a partial side elevation of the indicator;

Fig. 3 is a detail sectional view of the actuating mechanism;

Fig. 4 is a detail sectional view of the part shown in Fig. 2; and

Fig. 5 is a sectional view thru the top of the part shown in Fig. 3.

Referring now to the drawings in detail, and more particularly to Fig. 1, 10 indicates the forward front part of the top of a vehicle, where the signal 11 is mounted to be viewed from both the front and the rear. This signal comprises a drum-like casing having an outer shell 1 preferably made of stamped sheet metal and bolted or otherwise rigidly secured at 12 to the top of the vehicle body. If, however, the device is applied to an open or touring car, the form of securing means would probably comprise a bracket secured to the side arm of the wind-shield.

Within this casing 11 is a cylindrical drum 13, Fig. 4, provided with a plurality of oppositely disposed similarly colored windows 14, the windows being preferably of translucent material, such as celluloid, and those windows having a normal position registering with the front and rear openings in the case are green to indicate a straight-ahead movement. A light, indicated at 15, is mounted within the drum 13 to illuminate these windows 14 for night use. Adjacent the two green windows are two red windows 16 for indicating a stopping of the vehicle, and these are followed by two arrows 17 of orange color, indicating a left turn, and these are in turn followed by two blue arrows 18 indicating a right turn, all arranged in sequence.

This drum 13 is mounted in suitable bearings 20 in the ends of the outer casing, and associated with one of these bearings is a spring means, such as a spiral spring 21, for example, tending to restore the drum 13 to normal position when the actuating mechanism hereinafter described is released. The opposite bearing has wound thereabout a flexible wire or cable 22 connected thru a pipe 23 with the actuating mechanism within the car, whereby when the cable is pulled downwardly, either manually or automatically, the drum 13 will be rotated a predetermined amount according to the extent of pull thereby to bring the proper colored signal opposite the openings or windows 24 in the front and rear of the casing, as shown in Fig. 2.

Within the car and preferably secured to the dash or instrument board 25 as by means of a bracket arm 26 is secured or positioned the actuating mechanism, indicated by the numeral 27. This mechanism comprises a cylindrical outer and fixed casing 28 having three converging grooves, shown in detail in Fig. 2, that is, a normally vertical groove 30, a groove 31 extending downwardly at approximately forty-five degrees to the right, and a second groove 32 similarly shaped extending towards the left. Both of these grooves are provided at their lower ends with offset portions 33 adapted to be engaged by an actuating handle 34 mounted upon an inner cylindrical member 35 adapted for vertical and rotary movement and connected with the wire for turning the indicating drum 13.

It will be noted that one of these downwardly extending grooves 31 is longer than the other 32. Consequently, when the handle 34 is grasped and moved downwardly to the right, for example, it will rotate the drum 13 a distance just sufficient to bring the blue arrows 18 into registry with the openings 24 in the casing 11, while if moved in the opposite inclined direction, it travels a greater (or less) distance, thereby to bring the orange arrows 17 into registry with the windows to indicate a turn in the opposite direction. If, however, the handle 34 is moved straight down, it rotates the drum 13 a lesser distance to thereby bring the red disks 16 into registry with the windows in the casing to indicate a slowing down or stopping of the vehicle.

It will also be noted that the actuating cord 22 connected with the inner tubular actuating member extends downwardly and is connected with the clutch pedal 36. As this clutch is always thrown out when the vehicle is materially slowed down or is being brought to a stop, the cord 22 will automatically exert a direct downward pull thereby to bring the red disks 16 into view. Inasmuch as the clutch 36 is sometimes depressed a greater extent than at others, it is desirable to provide a stop 37 upon the cord 22 to coact with a bracket 38 below the actuating mechanism and above the interposing spring 40 between the lower end of the wire and the foot pedal whereby any excess movement of the pedal is absorbed by the spring, thereby eliminating a strain upon the indicator.

From the above, it is believed that the operation of the device will be clear to those familiar with the subject. It may be stated, however, that in operation, it is unnecessary for the driver's eyes to leave the road. The operating handle 34 is within convenient reach, and all that is necessary is to move it either to the right or left into the downwardly extending grooves, as desired, to indicate the turn about to be taken. In previous mechanisms, a plurality of stops have sometimes been provided adapted to be engaged by a detent on a lever, and with such mechanisms it was always necessary to watch the movement of the handle into its proper detent, which necessitated the driver's eyes leaving the road and sometimes causing accidents. The present invention is positive and sure in its operation, and the handle is moved in the right direction and is locked in its moved position without any special mental effort on the part of the operator.

From the above, it will be seen that the present invention provides a simple and practical mechanism well adapted to accomplish all of the objects and advantages herein set forth. The signal occupies a prominent place on the vehicle and is viewable to cars both in front and rear. Being in part automatic, no effort is required by the operator in stopping the vehicle to indicate a proper signal, and to indicate a turn merely necessitates a single movement either to the right or left, according to the turn about to be made. The device is of simple and practical construction, may be easily manufactured, assembled and installed upon a car.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a direction indicator of the character herein described, in combination, an outer casing having front and rear windows diametrically disposed, a rotatable drum having oppositely disposed similar signaling means of translucent material, and means for rotating said drum to bring any desired signaling means into registry with the openings in the casing, said means including a cord extending from the drum, a fixed member adjacent the driver's position and having converging slots therein, a rotatable member in said fixed member and connected with the cord, and a handle on said rotatable member extending thru and movable along said slots.

2. In a direction indicator of the character herein described, in combination, an outer casing having front and rear windows diametrically disposed, a rotatable drum having oppositely disposed similar signaling means of translucent material, actuating means selectively rotatable to the right or left or movable longitudinally for rotating said drum to bring any desired signaling means into registry with the openings in the casing, means for locking the drum in its moved position, and means for restoring the drum to normal position, said actuating means being in part manual and in part automatic in its longitudinal movement.

3. In a direction indicator of the character herein described, in combination, a casing, a revoluble drum mounted in said casing, spring means normally holding said drum in predetermined position, a cord for rotating said drum, means convenient to the operator and connected with said cord to actuate the cord relatively downwardly, said means including a handle adapted to be turned either to the right or left to indicate a corresponding turn of the vehicle, and automatic means for moving said cord downwardly to indicate a slowing down or stopping of the vehicle.

4. In a direction indicator of the character herein described, in combination, a casing, a revoluble drum mounted in said casing, spring means normally holding said drum in predetermined relation, an actuating cord for rotating said drum, actuating means convenient to the operator connected with said cord, including a handle adapted to be moved either to the right or left to indicate a corresponding turn of the vehicle, automatic means for moving said handle downwardly to indicate a slowing down or stopping of the vehicle, and means for locking said handle at the end of its movement when indicating a turn.

5. In a direction indicator of the character herein described, in combination, a cylindrical casing adapted to be mounted on the front forward part of the vehicle, said casing having diametrically oppositely disposed windows, a rotatable drum carrying signals mounted within said casing, a light within the casing for illuminating said signals, spring means for holding and returning said drum to normal position, an actuating member for rotating the drum against the action of a spring, and means selectively rotatable to the right or left or movable relatively downwardly and disposed adjacent to the operator for rotating said drum predetermined amounts, thereby, to bring the desired signal means into registry with the windows in the casing.

6. In a direction indicator of the character herein described, in combination, a cylindrical casing adapted to be mounted on the front forward part of the vehicle, said casing having diametrically oppositely disposed windows, a rotatable drum carrying signals mounted within said casing, a light within the casing for illuminating said signals, spring means for holding and returning said drum to normal position, an actuating member for rotating the drum against the action of a spring, and means selectively rotatable to the right or left or movable relatively downwardly and disposed adjacent to the operator for rotating said drum predetermined amounts to bring the desired signaling means into registry with the windows in the casing, said actuating means comprising a handle mounted for movement in different directions of different predetermined lengths, thereby to indicate right or left turns or stopping of the vehicle.

7. In a direction indicator of the character herein described, in combination, a cylindrical casing adapted to be mounted on the front forward part of the vehicle, said casing having diametrically oppositely disposed windows, a rotatable drum carrying signals mounted within said casing, spring means for holding or returning said drum to normal position, an actuating member for rotating the drum against the action of a spring, selective means convenient to the operator for rotating said drum predetermined amounts, thereby to bring the proper signaling means into registry with the windows in the casing, said actuating means comprising a handle having three movements in different directions of predetermined lengths to indicate right or left turns or stopping of the vehicle, and means connected with a control pedal and said actuating means for automatically bringing the proper signaling means into registry with the windows of the casing when the vehicle is being slowed down or stopped.

Signed at Buffalo, New York, this 2nd day of May, 1928.

ANDREW GALLEY.